United States Patent [19]

Browning et al.

[11] Patent Number: 5,420,997
[45] Date of Patent: May 30, 1995

[54] MEMORY HAVING CONCURRENT READ AND WRITING FROM DIFFERENT ADDRESSES

[76] Inventors: Gary A. Browning, 325 Fern Dr., Boulder Creek, Calif. 95006; Allan J. Zmyslowski, 1616 Hollenbeck #19, Sunnyvale, Calif. 94087; Edward G. Ryba, 1480 Michael Ct., Milpitas, Calif. 95035

[21] Appl. No.: 816,111
[22] Filed: Jan. 2, 1992
[51] Int. Cl.[6] .............................. G06F 12/06
[52] U.S. Cl. ........................ 395/425; 364/DIG. 1; 364/243.6; 364/254.2
[58] Field of Search ................. 395/400, 425; 364/200 MS File, 900 MS File

[56] References Cited

U.S. PATENT DOCUMENTS

| | | | |
|---|---|---|---|
| 4,599,708 | 7/1986 | Schuster | 365/189 |
| 4,734,850 | 3/1988 | Torii | 395/425 |
| 4,980,817 | 12/1990 | Fossum et al. | 395/800 |
| 5,001,665 | 3/1991 | Gergen et al. | 395/400 |
| 5,179,689 | 1/1993 | Leach et al. | 395/425 |

Primary Examiner—Joseph L. Dixon
Assistant Examiner—Hiep T. Nguyen

[57] ABSTRACT

A random access memory (RAM) complex that can concurrently read and write to different addresses. The memory complex includes two RAMs, each having an address selector, includes a data out multiplexer for selecting outputs from one of the RAM's. A tag array stores an array of tag, one for each address in the RAM's. The tag marks which one of the two RAM's has the valid data for the corresponding read address. During a concurrent read and write cycle, the tag selects the read address for one RAM, selects the write address for the other RAM and a staged copy of the tag controls the multiplexer to select data from the correct RAM for the data out.

6 Claims, 5 Drawing Sheets

MEMORY HAVING CONCURRENT READ AND WRITING FROM DIFFERENT ADDRESSES

BACKGROUND OF THE INVENTION

The present invention relates to the field of memories for computers and particularly to random access memory (RAM) for computers.

Most RAM's can perform concurrent reading and writing but only to the same address. Without the ability to read and write concurrently to different addresses, two cycles are required, one to perform reading and one to perform writing to the different addresses. Such a two cycle operation requires twice as much time and hence performance may be twice as slow in some circumstances.

Computers are of many different designs and include, for example, those operating in accordance with the IBM ESA/390 architecture. One such well-known computer is the Amdahl 5995-A computer. In that computer, the instruction unit (I-Unit) pipeline is a six-stage pipeline consisting of stages D, A, T, B, X, and W for the pipeline processing of instructions. Instructions having additional time for processing may add segments Z, Z+1, Z+2 and so on after the W segment.

The function of the D stage is to collate the necessary information to reference storage in the A, T, and B stages. The D-stage generates the effective address and selection of the access key to be used in the reference to storage. The A, T, and B stages fetch operands/data from storage using the current key. The X stage is for executing arithmetic or other operations using the fetched operands/data to form results. The W (write) stage writes the results of operations to architecturally defined registers or storage.

A computer operating in accordance with the above pipelining is represented as follows in TABLE A:

TABLE A

| | | |
|---|---|---|
| $I_1$ | DATBXW | flow 1 |
| $I_2$ | DATBXW | flow 2 |
| $I_3$ | DATBXW | flow 3 |
| $I_4$ | DATBXW | flow 4 |
| $I_5$ | DATBXW | flow 5 |
| $I_6$ | DATBXW | flow 6 |
| | -time→ | |

In TABLE A, the six instructions $I_1, I_2, \ldots, I_6$ are introduced into the instruction register (IDR) with, for example, a one cycle offset. If processing at any of the D,A,T,B,X or W segments cannot be completed in one cycle, then the pipeline must be sowed down so that the operation requiring more time can complete.

In prior art pipeline systems, without the ability to read and write RAM memory concurrently, an additional interlock was employed in the pipeline, delaying the read flow for the memory until the write flow had finished. Such a delay required slowing down the pipeline and was implemented with an interlock, named the Register Access Interlock (RAI). An example is given below of a pipeline sequence attempting to perform concurrent read and write operations.

TABLE B shows attempted concurrent read and write operations using non-RAI operation and TABLE C shows concurrent read and write operations using RAI operation.

TABLE B

| | | | | | | | | | | |
|---|---|---|---|---|---|---|---|---|---|---|
| 1. Write RA14 | D | A | T | B | X | W | Z | Z1 | | flow 1 |
| 2. — | | D | A | T | B | X | W | Z | Z1 | flow 2 |
| 3. — | | | D | A | T | B | X | W | Z | Z1 | flow 3 |
| 4. Read RA16 | | | | D | A | T | B | X | W | Z | Z1 | flow 4 |
| RAM Write | | | | | | ■ | | | | |
| RAM Read | | | | | | ■ | | | | |

In the example of TABLE B, the flow 4 may be invalid in prior art systems in which a read and write cannot occur simultaneously. In order to overcome the problem of TABLE B, an RAI interlock can be introduced into the pipeline as represented by TABLE C.

TABLE C

| | | | | | | | | | | | |
|---|---|---|---|---|---|---|---|---|---|---|---|
| 1. Write RA14 | D | A | T | B | X | W | Z | Z1 | | | flow 1 |
| 2. — | | D | A | T | B | X | W | Z | Z1 | | flow 2 |
| 3. — | | | D | A | T | B | X | W | Z | Z1 | flow 3 |
| 4. Read RA16 | | | | D | A | T | B | B | X | W | Z | Z1 | flow 4 |
| RAM Write | | | | | | ■ | | | | | |
| RAI Interlock | | | | | | | ■ | | | | |
| RAM Read | | | | | | | | ■ | | | |

In TABLE C, a one cycle delay is introduced into flow number 4 as indicated by two B segments using RAI Interlocks when a concurrent read and write are requested. If flows 2 and 3 also perform write operations, they can introduce up to two more cycles of delay further reducing performance.

Accordingly, because of the delays introduced when concurrent read/write accesses to memory are required, there is a need for an improved RAM complex that enables concurrent reading and writing to different addresses in memory.

SUMMARY OF THE INVENTION

The present invention is a random access memory (RAM) complex that can concurrently read and write to different addresses. The memory complex includes two RAMs, each having an address selector. The memory complex includes a data out multiplexer for selecting outputs from one of the RAM's. The memory complex includes a tag array storing an array of tag bits, one for each address in the RAM's. The tag bits are used to control the address selectors and multiplexer.

A single bit tag is provided in the tag array for each entry in the RAM's. The tag marks which one of the two RAM's has the valid data for the corresponding specific address tag. During a RAM read cycle, the tag routes the read address through the address selector for the correct one of the RAM's. The correct RAM is read using the read address and a staged copy of the tag controls the data out selector to select data from the correct RAM for the data out bus.

During a concurrent read and write cycle, the tag selects the read addresses for one RAM and selects the write address for the other RAM. A write enable signal, is provided for the write RAM. The tag for the write address is then updated in the tag array to point to the write RAM.

With the ability to read and write concurrently to different addresses, the present invention improves performance by using only a single operation to concurrently read and write to the same address in a RAM complex.

The foregoing and other objects, features and advantages of the invention will be apparent from the following detailed description in conjunction with the drawings.

DESCRIPTION OF THE PREFERRED EMBODIMENTS

Figure 1:
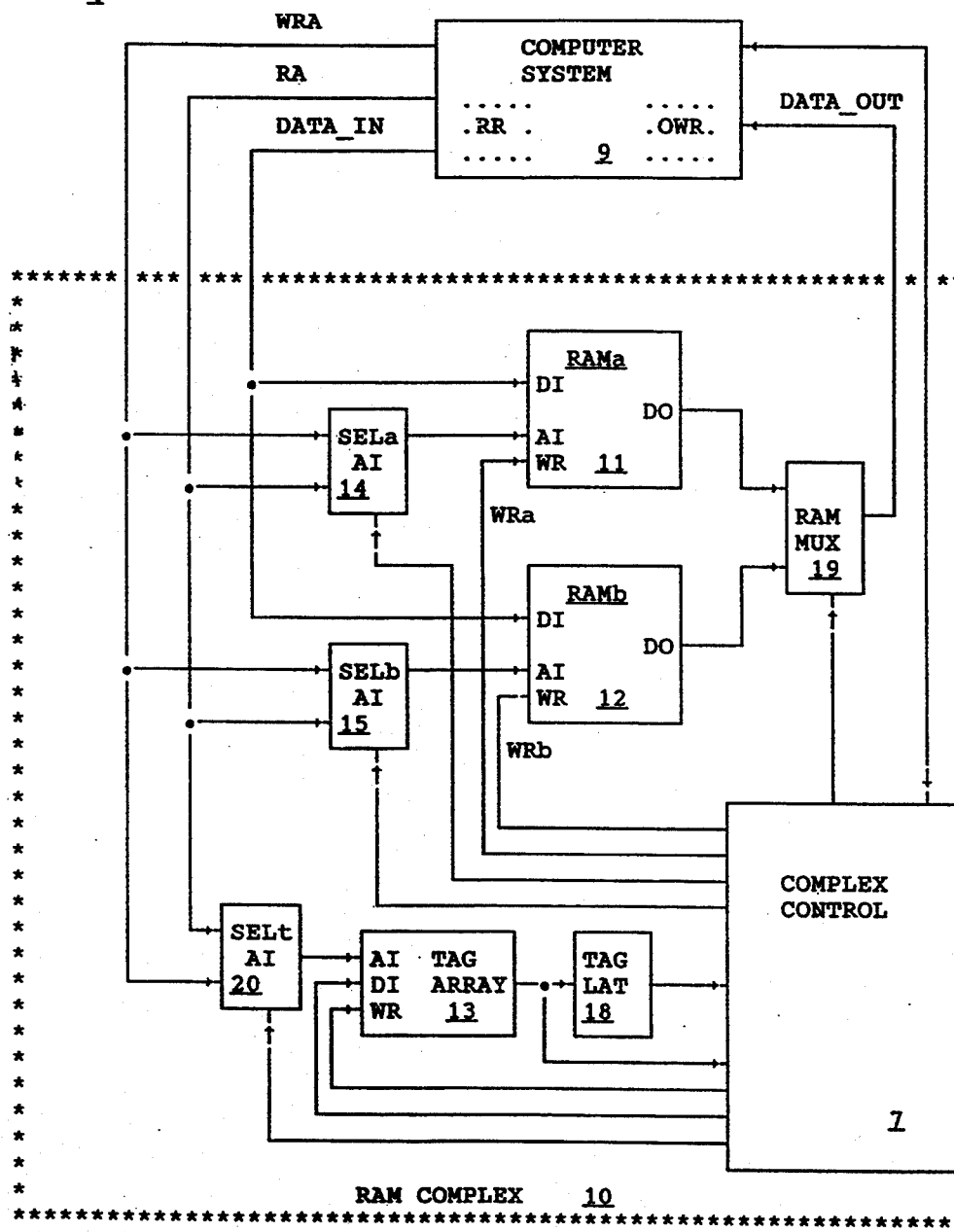
FIG. 1 depicts a block diagram of a computer including a memory formed of a RAM complex in accordance with the present invention.

In FIG. 1, the computer system 9 together with the RAM complex 10 forms a computer 4 which operates in accordance with the present invention. The computer 4 can be any computer, for example, the computer 4 is like the Amdahl 5995-A computer which processes instructions using an instruction pipeline.

Single Port Embodiment—FIG. 1

FIG. 1 depicts a block diagram of computer a computer system 9 and memory formed of a RAM complex 10 in accordance with the present invention. The ram complex 10 includes two RAM's, $RAM_a$ 11 and $RAM_b$ 12, each with its own address selector, $SEL_a$ 14 and $SEL_b$ 15, a data out RAM multiplexer 19, a tag array 13 for storing tags, one for each address in the RAM's 11 and 12. The address selector, $SEL_t$ 20, is provided for selecting addresses into the tag array 13. A tag latch 18 is provided for staging tags accessed from the tag array 13. Complex Control 7 is provided for controlling RAM complex 10.

Although a RAM cannot be read from and written to at the same time, a pair of RAM's are combined to perform this operation. The first RAM may be reading data from one address while the second RAM is being updated by writing at a different address. One of the RAM's has valid data for any given address and the tag bit keeps track of which RAM has the valid data.

The tags in tag array 13 mark which one of the two RAM's 11 and 12 has the valid data for the specific address to which the tag corresponds. During a RAM read cycle, a tag accessed from array 13 routes the read address through one the address selectors 14 or 15 to a corresponding one of the RAM's 11 or 12. The selected RAM is read and a staged copy of the tag in tag latch 18 is used to control the data out selection in multiplexer 19 which passes the read data via the data out bus to computer system 9.

During a concurrent read and write cycle, the tag from tag array 13 determines which RAM 11 or 12 will be needed for the read. The other RAM is therefore available for the write operation. Thus, the tag is used to select the read and write addresses through the address selectors 14 and 15 and a write enable signal, $WR_a$ or $WR_b$, is sent to the RAM to be written. The tag for the write address is then updated in the tag array 13 to point to the write RAM.

In FIG. 1, the RAM complex 10 is controlled by the RAM complex control 7. Control 7 receives the tag from array 13, and the staged tag from latch 18 and control signals from computer system 9. The control signals from system 9 includes clock and other conventional timing signals. In a pipeline embodiment with stages, the control signals include D-Release, A-Release, T-Release, B-Release, X-Release, and W-release signals which designate the pipeline timing for the D, A, T, B, X and W segments, respectively.

In the RAM complex 10, the RAM's 11 and 12 receive the DATA INput data bus from the computer system 9 on the data in (DI) inputs and receive write enable signals $WR_a$, and $WR_b$ form Control 7 provides selection signals to selectors $SEL_a$ 14, $SEL_b$ 15, $SEL_t$ 20. The computer system 9 provides a read address, RDA, and a write address, WRA, which connect through the selection gates 14 and 15 to the address in, inputs (AI) of both RAM's 11 and 12. If selector 14 selects the write address, then selector 15 selects the read address, and vice versa. The tag array 13 provides an output through control 7 to the selectors 14 and 15 to control which of the selectors 14 or 15 are to select the read address and which is to select the write address. The tag latch 18 latches the output from the tag array 13 which is used to control the selectors 14 and 15. The value of the tag from the tag array 13 as stored in the tag latch 18 controls which one of the outputs form the RAM's 11 and 12 will be selected by the output multiplexer 19 as the data output which is connected to the computer system 9. The RAM 11 or 12 which receives a read address from the selector 14 or 15 will provide data which is selected by the output selector 19-0. Specifically, the RAM 11 or 12 which is selected for reading and hence receives a read address from selector 14 or 15 will have the read output selected by the output selector 19.

The other one of the RAM's 11 or 12 which receives the write address will store the data presented at the data input (DI) at the write address location.

Dual Port Embodiment—FIGS. 2, 3, 4, and 5

Figure 2:
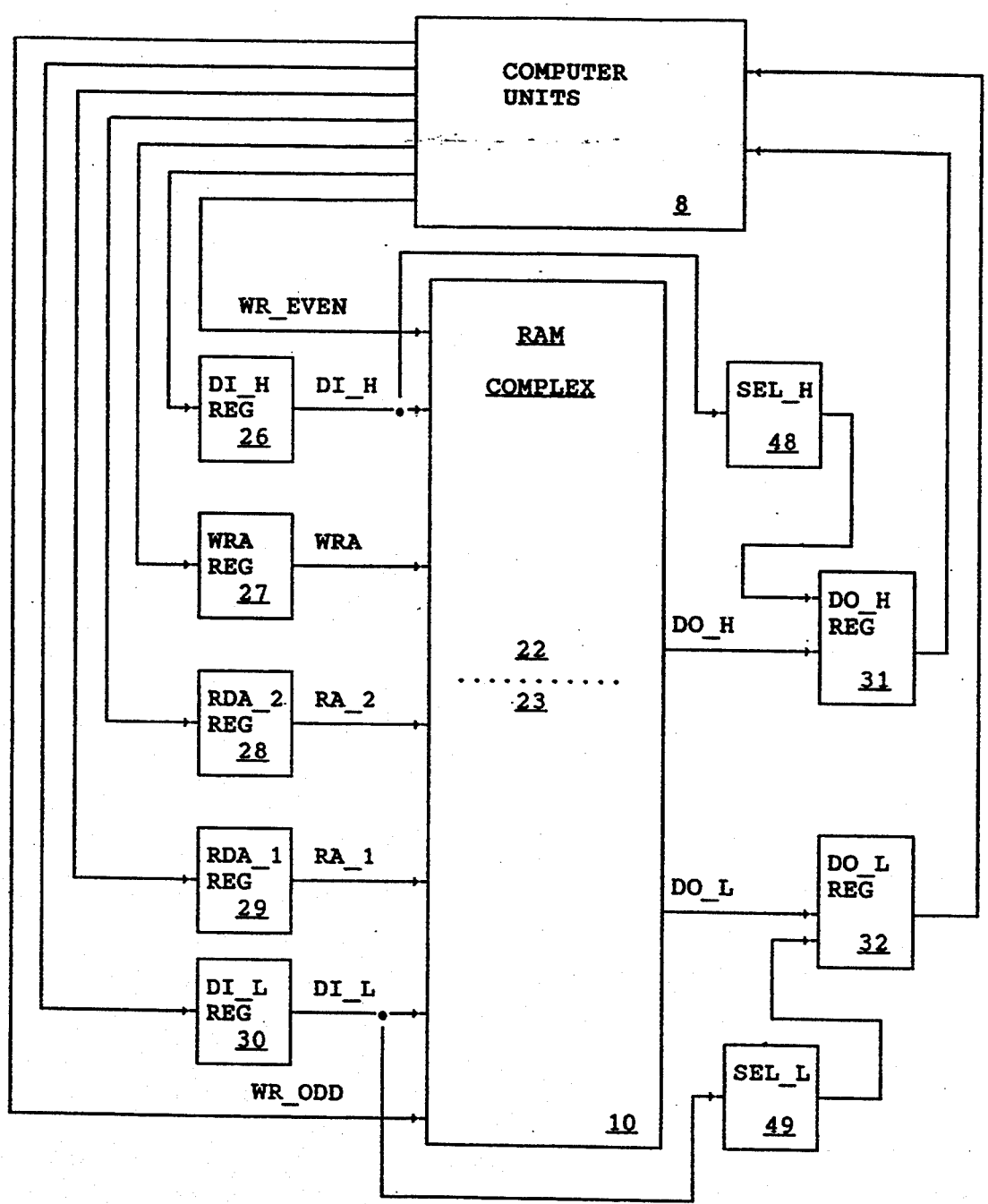
FIG. 2 depicts a block diagram of a dual ported computer including memory formed of RAM complexes in accordance with the present invention.

In FIG. 2, a computer is depicted which uses RAM complexes of the type described in connection with FIG. 1 to form a dual ported memory. In FIG. 2, computer units 8, as part of the computer of FIG. 2, provide WR_EVEN and a WR_ODD write enable signals to the RAM complex 10. The RAM complex 10 is organized into an even section 22 and into an odd section 23.

Computer units 8 provide data to two input data registers, namely, a DI_H register 26 and an DI_L register 30. These data registers 26 and 30 provide the dual input ports to the RAM complex 10.

The computer units 8 provide a write address, WRA, to write address register 27. Also the computer units 8 provide two read addresses to the read address registers RDA_2 28 and RDA_1 29.

When read operations occur in FIG. 2, the RAM complex 10 provides the read data to the data registers DO—H 31 and DO—L 32. These data out registers 31 and 32 in turn connect data to the computer units 8 for use in the computer system.

Figure 3:
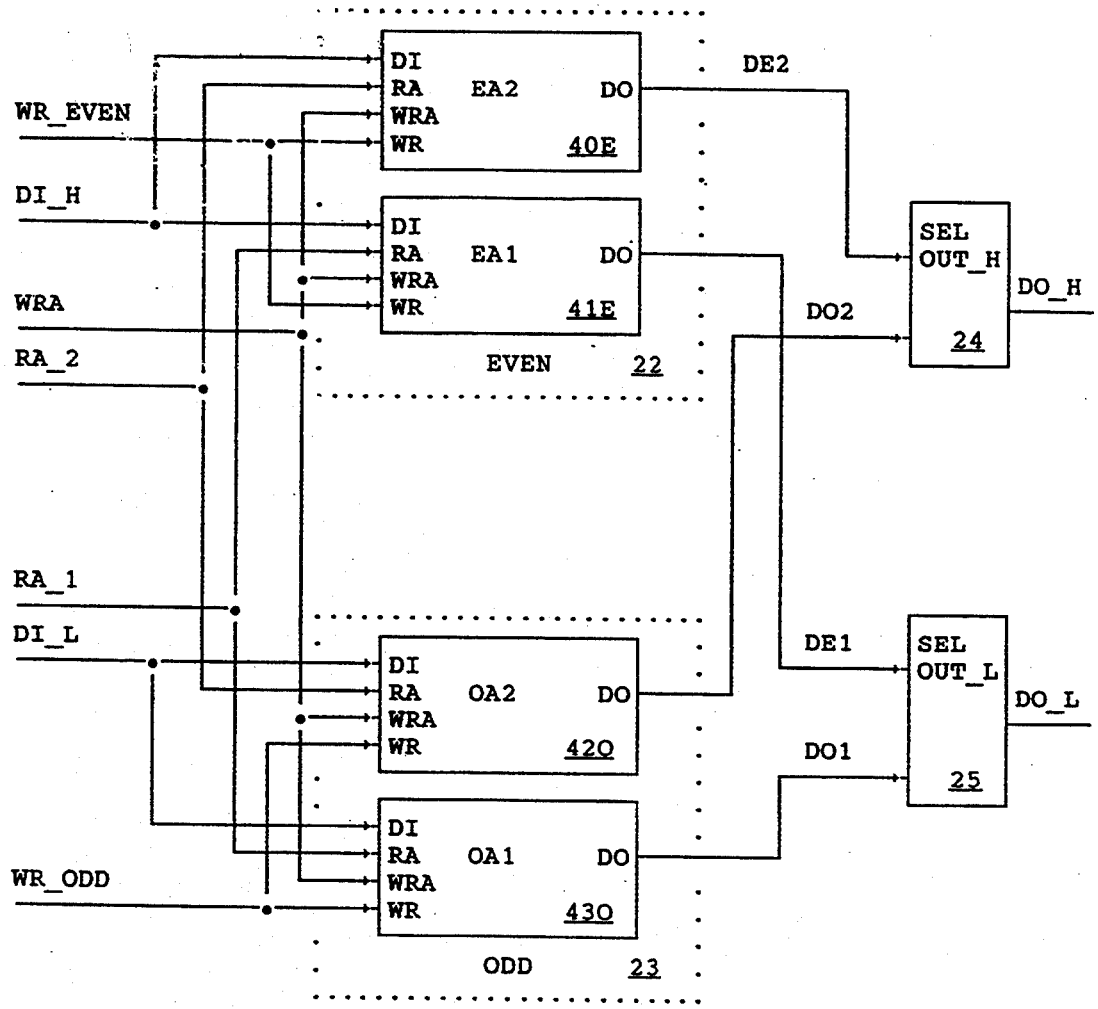
FIG. 3 depicts a more detailed block diagram of the RAM complex of FIG. 2.

In FIG. 3, further details of the RAM complexes 10 of FIG. 2 are shown. The memory complex of FIG. 3 includes even arrays 22 and odd arrays 23. The even arrays include the even array 2 (EA2) 40E and the even array 1 (EA1) 41E.

The even arrays 22 and specifically arrays 40E and 41E receive the write enable signals, WR—EVEN, at the WR inputs, receive the write address (WRA) on the WRA inputs and receive the data input DI—H at the DI input. The EA2 array 40E receives the read address RDA—2 and the even array 1 (EA1) 41E receives the read address RDA—1.

In FIG. 3, the odd arrays 23 include the odd array 2 (OA2) 40O and the odd array 1 (OA1) 43O. The data input DI—L connects the DI inputs of the odd arrays 42O and 43O. Similarly, the write address connects to the WRA inputs of the odd arrays 42O and 43O. The arrays 42O and 43O receive the WR—ODD enable signal at the WR inputs. The odd array 2 (OA2) receives the read data address RA—2 and the odd array (OA1) receives the read address RA—1.

The outputs from the even arrays 22 and the odd arrays 23 connect to the selection outgates 24 and 25. The selection outgate (SEL OUT—H) 24 receives the even output DE2 from the even array 2 (EA2) and receives the odd output 2 (DO2) from the odd array 2 (OA2). The selection outgate 25 (SEL OUT—L) receives the even output (DE1) from the even array 1 (EA1) and receives odd array 1 output (DO1) from the odd array 1 (OA1). The selector 24 selects between DE2 and DO2 to provide the DO—H output and the selector 25 selects between DE1 and DO1 to provide the output DO—L.

Figure 4:
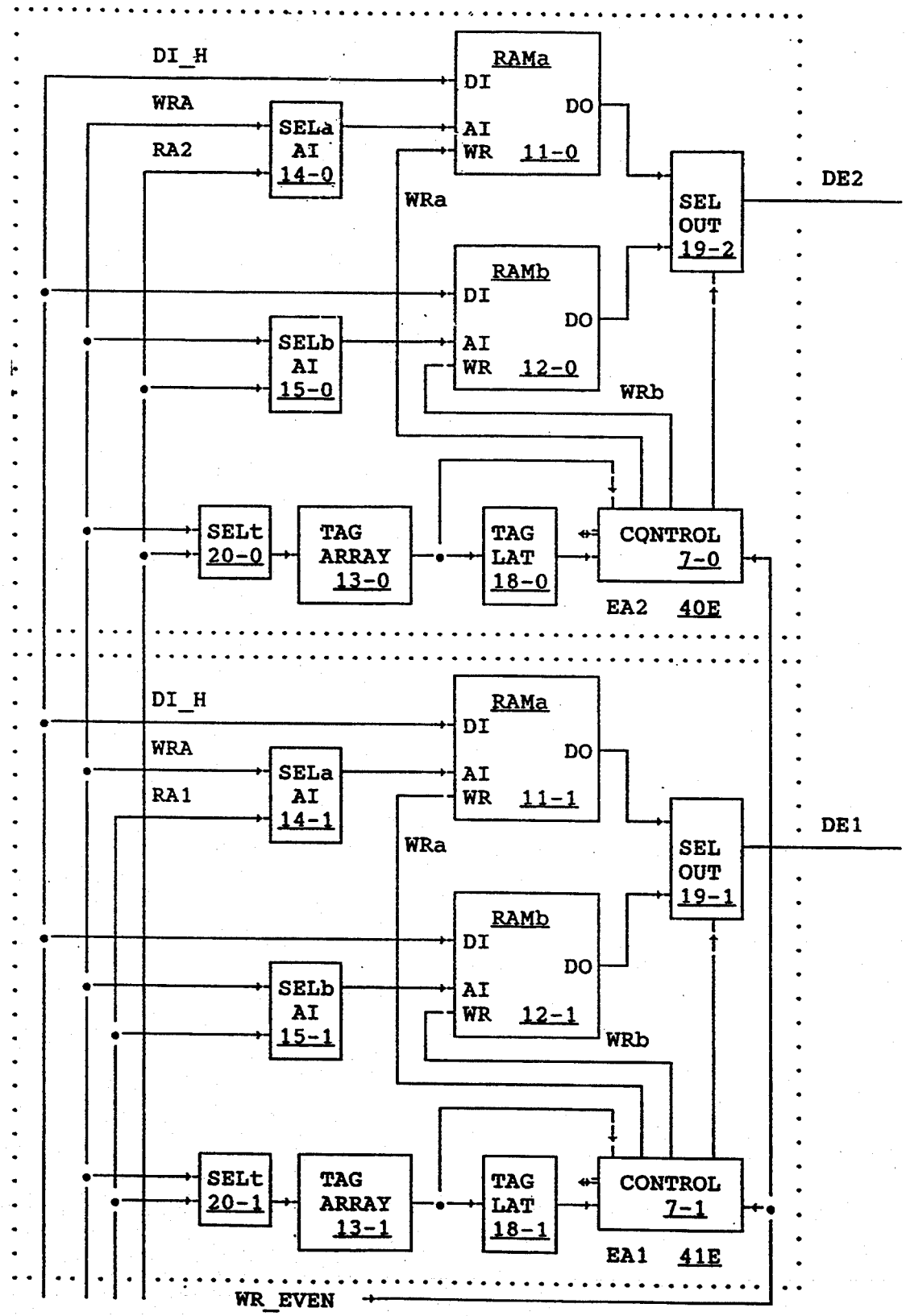
FIG. 4 depicts a more detailed block diagram of an even partitioned portion of the RAM complex of FIG. 3.

In FIG. 4, further details of the even arrays 22 of FIG. 3 are shown. The even arrays of FIG. 4 include the even array 2 (EA2) 40E and the even array 1 (EA1) 41E. The functions of the arrays 40E and 41E are like the RAM complex of FIG. 1.

Figure 5:
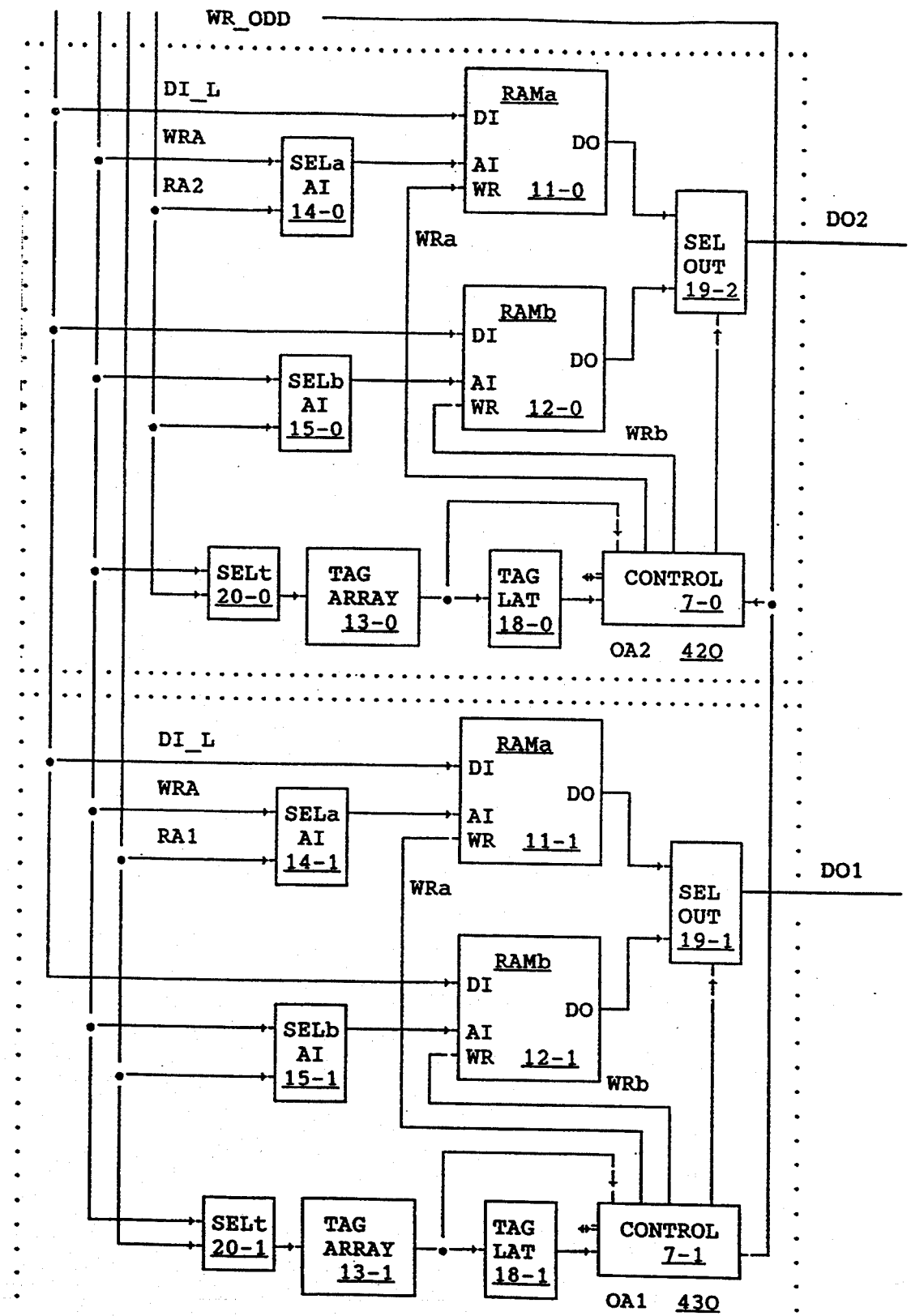
FIG. 5 depicts a more detailed block diagram of an odd partitioned portion of the RAM complex of FIG. 3.

In FIG. 5, further details of the odd arrays 23 of FIG. 3 are shown. The odd arrays of FIG. 5 include the odd array 2 (OA2) 42O and the odd array 1 (OA1) 43O. The functions of the arrays 42O and 43O are like the RAM complex of FIG. 1.

The register arrays of FIGS. 2, 3, 4 and 5 have the benefits of concurrent reading and writing, selection between a single register or even/odd sequential double register write port (DI—H register 25 and DI—L register 30), and two independently addressable read ports (DO—H register 31 and DO—L register 52).

Memory Complex Operation

There are four ways of accessing the RAM complex of FIGS. 2, 3, 4 and 5, read only, write only, read and write to different addresses and read and write to the same addresses. These four ways are described below.

Read Only

The RA address is used as an index into the tag array during the T-segment to read the Tag Bit associated with the register desired. This Tag Bit is used during the T-segment to determine which RAM has the most current data for the specified register. In the T-segment, the read address, RA Addr, will be selected into the RAM pointed to by the Tag Bit. The Tag Bit is also staged to the B-segment where it is used to control a selector to select between the data out lines of the RAM's.

Referring to FIG. 1, by way of example, the RA address from system 9 is used as an index into the tag array 13 during the T-segment to read the Tag Bit associated with the address desired. The T-segment is timed by a pipeline T-Release signal, from system 9. Complex control 7 receives a read-only command from system 9 and causes the selector SEL$_t$ 20 to select the read address RA in the T-segment and address tag array 13 to access the Tag Bit. This Tag Bit during the T-segment determines which RAM has the most current data for the specified address by providing a logical 1 or logical 0 indication. For example, if the Tag Bit is a 1 for example, SEL$_a$, is enabled (with an "Addr Slct T-RA" signal to selector 15) to select the read address and SEL$_b$ is enabled to select the write address (which is not used in this example). Assuming for example, that the Tag Bit at the RA Addr (RA) is 0, SEL$_b$ causes the RAM$_b$ to be read and the logical 0 is latched into tag latch 18. The Tag Bit in latch 18 is staged to the B-segment, the next segment in the pipeline, where it is used to control multiplexer 19 to select the data out lines of RAM$_b$. No write enable, WR$_a$ or WR$_b$, is generated by control 7. An example of the read operation is represented in TABLE 1 since the present example is read only. Control 7 includes conventional logic to generate the control signals as indicated in TABLE 1.

TABLE 1

| 1. Read RA12 | D | A | T | B | X | W |
|---|---|---|---|---|---|---|
| T-Release |   |   | — |   |   |   |
| B-Release |   |   |   | — |   |   |
| (Access Tags: Tag = RAMb) |   |   | — |   |   |   |
| RAMb Addr Slct T-RA |   |   | — |   |   |   |
| RAM Mux Slct RAMB |   |   |   | — |   |   |

If an interlock occurs in computer system 9 in the T-segment, the Tag Array will simply be re-read in the next T-segment. If an interlock occurs in the B-segment, the data read from the RAM will not be latched by a register (OWR) in system 9. The data must therefore be re-read so that it is available when the flow is released. Assuming that RAM$_a$ is identified by the Tag Bit as having valid data, the interlock operation is shown in TABLE 2. Note that the "Addr Slct T-RA" signal in the T-segment of TABLE 1 appears in the T-segment of TABLE 2 and is repeated again in the B-segment as "Addr Slct B-RA" to account for the interlock.

TABLE 2

| | D | A | T | B | X | X | W |
|---|---|---|---|---|---|---|---|
| 1. any Multi-X flow | D | A | T | B | X | X | W |
| 2. Read RA12 |   | D | A | T | B | B | X | W |
| B-RELEASE |   |   |   |   | -1- | -2- |   |   |
| (Access Tags: Tag-RAMa) |   |   |   | -2- |   |   |   |
| RAMa Addr Slct T-RA |   |   |   | -2- |   |   |   |
| RAMa Addr Slct B-RA |   |   |   |   | -2- |   |   |
| RAM Mux Slct RAMA |   |   |   |   | -2- | -2- |   |

Write Only

When only a write operation is required, the Tag Bit is used to find the RAM that has the most current data and the other RAM is written into. For the rest of this specification, the RAM will be assumed to be the RAM selected by the Tag Bit. TABLE 3 represents a simple write-only request.

TABLE 3

| 1. Write RA12 | D | A | T | B | X | W | Z |

TABLE 3-continued

| | |
|---|---|
| Tag Array Write Enable | — |
| (Tag = RAMa) | |
| RAMa Addr Slct W-WRA | — |
| RAMa Write Enable | — |
| Write Data to RAMa | — |

In TABLE 3, RAM Write Enable, $WR_a$, from the W-segment is used to enable the writing of data into $RAM_a$ in a subsequent segment, Z-segment.

Read and Write, Different Addresses

When reading and writing from different addresses in complex 10 at the same time, the read operation occurs as described earlier. The write operation uses the Tag Bit read in the T-segment to determine which of the two RAM's is not being used. The write address and data are selected into this unused RAM.

When either of the RAM's is written to, the Tags must be updated to reflect which RAM has the most current data for the register written. The Tags are updated on the Z to Z+1-segment transition to keep the Tags current for the next flow. The Z WRA write address selected by selector 20, in FIG. 1 for example, is used as the write address for the Tags and a tag value representing the RAM being written is used as the data. An example of concurrent reading and writing is given in TABLE 4.

TABLE 4

| | | | | | | | | | |
|---|---|---|---|---|---|---|---|---|---|
| 1. Write RA14 | D | A | T | B | X | W | Z | Z+1 | |
| 2. — | | D | A | T | B | X | W | Z | Z+1 |
| 3. — | | | D | A | T | B | X | W | Z |
| 4. Read RA16 | | | | D | A | T | B | X | W | Z |
| (Access Tags: Tag = RAMb) | | | | | -4- | | | | |
| Tag Write Enable (Tag = RAMa) | | | | | | -1- | | | |
| RAMaAddr Slct W-WRA | | | | | -1- | | | | |
| RAMa Write Enable on Next B | | | | | -1- | | | | |
| RAMa Write Address | | | | | -1- | | | | |
| RAMb Addr Slct T-RA | | | | | -4- | | | | |
| RAM Mux Slct RAMb | | | | | | -4- | | | |

If an interlock occurs in the B-segment, writes may still occur from the a register (RR) in the system 9. The example of TABLE 5 depicts two different writes occurring to the RAM's, one just before the pipeline is interlocked and another while the pipeline is interlocked in the X-segment.

TABLE 5

| | | | | | | | | | | |
|---|---|---|---|---|---|---|---|---|---|---|
| 1. Write RA12 | D | A | T | B | X | W | Z | Z+1 | | |
| 2. WRITE RA14 | | D | A | T | B | X | W | Z | | |
| 3. | | | D | A | T | B | X | X | W | |
| 4. READ RA16 | | | | D | A | T | B | B | X | W |
| (Access Tags: Tag = RAMa) | | | | | -4- | | | | | |
| Tag Write enable (Tag = RAMa) | | | | | | -1- | -2- | | | |
| RAMb Addr Slct W-WRA | | | | | | -1- | -2- | | | |
| RAMb Write Enable on Next B | | | | | | -1- | -2- | | | |
| RAMb Write Address | | | | | | -1- | -2- | | | |
| B-Release | | | | | | -1- | -2- | -3- | -4- | |
| RAMa Addr Slct T-RA | | | | | | | | -4- | | |
| RAMa Addr Slct B-RA | | | | | | | | | -4- | |
| RAM Mux Slct RAMa | | | | | | | | | -4- | -4- |

Read and Write, Same Address

When the special case of reading and writing to the same address occurs, the value read from the RAM will be inaccurate. The problem can be taken care of by a RAM bypass as described below. As in a normal write operation, the data from system 9 is latched on the T to B-segment transition where it will be written during the following B-segment. For the read operation during the B-segment, a bypass occurs bypassing the master outputs of the RAM's DI registers to the output bus using selection 48 and 49 instead of the RAM's DO (Data Out) lines DO__H and DO__L lines. The bypass is determined in the T-Segment and the signal is staged into the B-segment. The bypass operation is shown in connection with TABLE 6.

TABLE 6

| | | | | | | | | | |
|---|---|---|---|---|---|---|---|---|---|
| 1. Wr RA10 | D | A | T | B | X | W | Z | Z+1 | |
| Write RAM Data | | | — | | | | | | |
| 2. Read RA1-0 | | D | A | T | B | X | W | Z | Z+1 |
| RR In Bypass | | | | — | | | | | |
| 3. Read RA10 | | | D | A | T | B | X | W | Z | Z+1 |
| RR Out Bypass | | | | | — | | | | |
| 4. Read RA10 | | | | D | A | T | B | X | W | Z | Z+1 |
| RAM Bypass | | | | | — | | | | |
| 5. Read RA10 | | | | | D | A | T | B | X | W | Z | Z+1 |
| Read RAM DATA | | | | | | — | | | | |

In the first flow of TABLE 6 the write address, write enable and data are latched in the W to Z segment. The data is written in the Z segment and hence is not available for reading till flow 4. With the operation of TABLE 6, the read operations in flow 2 and 3 will read invalid data. To overcome the invalid data, the bypass is used. In flow 2, the bypassed data occurs in system 9 using a Result Register bypass (RR In Bypass). In flow 4 the data is still not valid until the next segment since the RAM is still being written. So a Bypass is used. The new data is bypassed from the Data In port to the Data Out port, using selectors 48 and 49 in FIG. 2.

The RAM bypasses are required for two cases as follows:

(1) A W to W+1-segment write occurs at the same time as a T to B-segment reading of the Tags. In this case the RAM's will have valid data when needed at the end of the last B-segment but the Tag read will not be valid. Note that the bypass data will be in the DI register of the RAM associated with the invalid Tag Bit.

(2) A W to W+1-segment write occurs at the same time as the RAM's are being read but there is no B RElease. Without the B RElease, the RAM's may or may not be up-to-date in time to be read into a register (OWR) in system 9 depending on the length of the interlock but the Tag will be invalid. To resolve this problem, the data will be stored in the DI (Data In) register (26, 30) of the RAM being read. This data will then be used in the bypass when the B-segment is released.

Two Read Ports

Two read ports are desireable for certain operations in the FIG. 9 system. The RAM complexes described are able to read and write at the same time, where the write is on the W to W+1 transition of the pipeline and the read in the B-segment.

To allow two read ports, two units are used together as shown in FIGS. 2, 3, 4 and 5. If both units are updated at the same time from the system 9, the two units will always have duplicate data. Externally, the two units give two independent read ports and one write port.

Even/Odd Double Register Writes

This embodiment allows Even/Odd double register writes. To allow even/odd double writes, two units are used. The even registers are stored in one unit while the odd registers are stored in the other. The data for the write port comes from system 9. When single registers are written, the data will appear on DI_H. When even/odd double registers are written, the even register's value will appear on the DI_H and the odd register's value will appear on the DI_L.

When performing single register write operations, the DI_H data is gated into both the Even and Odd register units. The upper eight bits of the address are used as the write address for both units. The lowest address bit is used to decide which of the Units, Even or Odd, will be enabled for writing. An odd write address will enable the Odd Unit for writing, and an even write address will enable the Even Unit.

When performing even/odd double register write operations, the DI_H which has the value for the even register is sent to the data port of the Even Unit and the DI_L which has the value for the odd register is sent to the Odd Unit. The upper eight bits of the address are sued as the write address for both units. Both units are then enabled for writing.

The embodiment also supports two independent read ports to any registers. The operation of the Port1 read port, DO_H, will be described and is also representative of the Port2 read port, DAL. To perform a read of any register, the high order 8 bits of the address are sent to the read ports on both the Even and Odd Units. The Units together will return the even/odd register pair associated with the address. The lowest bit of the address is then staged to the next segment where it is used to select the even or odd register onto the Port 1 data output bus.

This organization in an embodiment that allows 256 even registers and 256 odd registers provides a total of 212 registers.

While the invention has been particularly shown and described with reference to preferred embodiments thereof it will be understood by those skilled in the art that various changes in form and details may be made therein without departing from the spirit and scope of the invention.

We claim:

1. A random access memory complex for use with a computer, where said computer provides input data to be written into the complex, receives output data read from the complex, provides write addresses for writing the input data into the complex, and provides read addresses for reading the complex to provide output data, said complex comprising, random access first and second memories, each memory including, an address input for receiving a read address or a write address, a data input for receiving input data to be written, a write enable input for enabling writing of the input data at the input address, a data output for providing the output data from the complex, first and second memory addresses selectors, one for each of said first and second memories, for selecting a read address or a write address for the address input, a data output multiplexer for selecting the data output read from said first or said second memory, a tag array for storing tags indicating one of said first or second memories as storing valid data at the read address, and said tag array having, a tag address input for receiving a read address or a write address, a tag data input for receiving an input tag to be written, a write enable tag input for enabling writing of the input tag, a tag output for providing an output tag from the tag array when the tag address input receives the read address, a tag address selector for selecting a read address or a write address for the tag address input, control means for controlling said memory address selectors, said tag address selector and said data out multiplexer, said control means providing a read select signal to one of said memory address selectors indicated by the output tag to cause the read address to be selected for the address input of one of said memories and said control means providing a data out select signal to said multiplexer to select the output data form said one of said memories.

2. The memory complex of claim 1 wherein said computer provides the read address, the input data, and the write address concurrently to said complex, said control means providing a write select signal to the other of said memory address selectors to cause the write address to be selected for the address input of the other of said memories, providing a write enable signal to the other of said memories to write the input data into the other of said memories concurrently with the reading of the output data.

3. The memory complex of claim 1 wherein said computer operates over a plurality of pipeline stages for each instruction to be executed and wherein said complex includes a tag latch for staging a tag read from said tag array in one stage to a subsequent stage whereby said output data is selected in a stage subsequent to the writing of said input data.

4. A random access memory complex for use with a computer, where said computer provides input data to be written into the complex, receives output data read from the complex, provides write addresses for writing the input data into the complex, and provides read addresses for reading the output data from the complex, said complex comprising, random access first and second memories, first and second memory addresses selectors, one for each of said first and second memories, for selecting a read address or a write address for a memory, a data output multiplexer for selecting the data output read from said first or said second memory, a tag array for storing tags indicating one of said first or second memories as storing valid data at the read address, control means for controlling said tag array to read a tag from the read address, for controlling one of said memory address selectors in response to the tag to cause the read address to be selected for one of said memories, and for controlling said multiplexer to select the output data form said one of said memories.

5. The memory complex of claim 4 wherein said computer provides the read address, the input data, and a write address concurrently to said complex and said control means controlling the other of said memory address selectors to cause a write address to be selected for the address input of the other of said memories and controlling the other of said memories to write the input data.

6. The memory complex of claim 5 wherein said computer operates over a plurality of pipeline stages for each instruction to be executed and wherein said complex includes a tag latch for staging a tag read from said tag array in one stage to a subsequent stage whereby said output data is selected in a stage subsequent to the writing of said input data.

* * * * *